United States Patent
Betz et al.

(10) Patent No.: US 7,984,057 B2
(45) Date of Patent: Jul. 19, 2011

(54) QUERY COMPOSITION INCORPORATING BY REFERENCE A QUERY DEFINITION

(75) Inventors: Benjamin A Betz, Redmond, WA (US);
David G. De Vorchik, Seattle, WA (US);
Lyon F. K. Wong, Issaquah, WA (US);
Timothy P McKee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 141 days.

(21) Appl. No.: 11/125,328

(22) Filed: May 10, 2005

(65) Prior Publication Data
US 2006/0259449 A1    Nov. 16, 2006

(51) Int. Cl.
*G06F 7/00* (2006.01)
(52) U.S. Cl. ......... 707/759; 707/773; 707/774; 707/775
(58) Field of Classification Search .................. 707/773, 707/774, 775
See application file for complete search history.

(56) References Cited

U.S. PATENT DOCUMENTS

| | | | |
|---|---|---|---|
| 5,515,488 A * | 5/1996 | Hoppe et al. ............... 345/440 |
| 5,724,567 A | 3/1998 | Rose | |
| 5,870,746 A * | 2/1999 | Knutson et al. ............. 707/101 |
| 5,872,568 A * | 2/1999 | Alimpich et al. ............ 715/835 |
| 5,873,080 A * | 2/1999 | Coden et al. ...................... 707/3 |
| 5,926,809 A * | 7/1999 | Szalwinski ....................... 707/3 |
| 6,081,801 A * | 6/2000 | Cochrane et al. ................ 707/3 |
| 6,195,657 B1 * | 2/2001 | Rucker et al. ..................... 707/5 |
| 6,202,058 B1 | 3/2001 | Rose | |
| 6,356,899 B1 * | 3/2002 | Chakrabarti et al. ............ 707/5 |
| 6,496,692 B1 | 12/2002 | Shanahan | |
| 6,560,595 B1 * | 5/2003 | Sanders et al. ..................... 707/2 |
| 6,629,094 B1 * | 9/2003 | Colby et al. .................. 707/713 |
| 6,636,848 B1 * | 10/2003 | Aridor et al. ...................... 707/3 |
| 6,732,088 B1 * | 5/2004 | Glance ............................... 707/3 |
| 6,775,669 B2 * | 8/2004 | Uesaka .......................... 707/10 |
| 7,039,871 B2 * | 5/2006 | Cronk .......................... 715/741 |
| 7,620,620 B1 * | 11/2009 | Sedlar ............................... 707/3 |
| 7,730,084 B2 * | 6/2010 | Rowley et al. ............... 707/774 |
| 7,774,337 B2 * | 8/2010 | Moestl ......................... 707/721 |

(Continued)

FOREIGN PATENT DOCUMENTS
WO    WO2004/053687    6/2004

OTHER PUBLICATIONS

Catarci et al. "Visual Query Systems for Databases: A Survey" 1997. Dipartmento di Informatica e Sistemstica, Universita di Roma "La Sapienza."*
Vassillou et al. "Query Languages—A Taxonomy" May 1982. Center for Research on Information Systems Coputer Applications and Information Area Gradaute School of Business Administration New York University.*

(Continued)

*Primary Examiner* — Christyann R Pulliam
(74) *Attorney, Agent, or Firm* — Shook, Hardy & Bacon L.L.P.

(57) ABSTRACT

The present invention provides a computer method and system for querying or searching for at least one data file corresponding to a query definition. A first query is received which may provide a query definition that may be used as a scope of search for a second query. Modifications of the scope of search based on modification of the first query may be automatically reflected in the scope of search for the second query. The scope of search for the second query may further be a combination of a plurality of scopes based on a plurality of user-defined queries.

14 Claims, 16 Drawing Sheets

U.S. PATENT DOCUMENTS

| | | | | |
|---|---|---|---|---|
| 7,840,592 B2* | 11/2010 | Muras | | 707/769 |
| 7,937,390 B2* | 5/2011 | Moestl | | 707/736 |
| 2002/0099685 A1* | 7/2002 | Takano et al. | | 707/1 |
| 2002/0169766 A1* | 11/2002 | Aoyama | | 707/3 |
| 2003/0018634 A1* | 1/2003 | Shringeri et al. | | 707/4 |
| 2003/0088593 A1* | 5/2003 | Stickler | | 707/205 |
| 2004/0054662 A1* | 3/2004 | Dworkis et al. | | 707/3 |
| 2004/0068489 A1 | 4/2004 | Dettinger | | |
| 2004/0098379 A1* | 5/2004 | Huang | | 707/3 |
| 2004/0193594 A1 | 9/2004 | Moore | | |
| 2004/0254928 A1 | 12/2004 | Vronay | | |
| 2005/0034064 A1* | 2/2005 | Meyers et al. | | 715/513 |
| 2005/0091287 A1* | 4/2005 | Sedlar | | 707/200 |
| 2005/0097092 A1* | 5/2005 | Annau et al. | | 707/3 |
| 2005/0172007 A1* | 8/2005 | Avrahami et al. | | 709/219 |
| 2005/0187911 A1* | 8/2005 | Tunning | | 707/3 |
| 2006/0036567 A1* | 2/2006 | Tan | | 707/1 |
| 2006/0095845 A1* | 5/2006 | Van Leeuwen | | 715/700 |
| 2008/0154866 A1* | 6/2008 | Beyer et al. | | 707/3 |
| 2008/0215528 A1* | 9/2008 | Sedlar | | 707/1 |

OTHER PUBLICATIONS

Najork et al. "Breadth-First Search Crawling Yields High-Quality pp.", Mar. 1, 2001. Proceedings of the 10$^{th}$ International World Wide Web Conference.*

Kozankiewicz, Hanna and Jacek Leszczylowski and Kazimierz Subieta, Updateable XML Views, Springer-Verlag Berlin Heidelberg 2003, ADBIS 2003, LNCS 2798, pp. 385-399 (2003).*

Zhang, Liang-Jie, Tian Chao, Henry Chang and Jen-Yao Chung, XML-Based Advanced UDDI Search Mechanism for B2B Integration, Electronic Commerce Research, 3:25-42, Kluwer Academic Publishers (2003).*

JH terBekke and JA Bakker, Recursive Queries in Product Databases, Springer-Verlag Berlin Heidelberg, FQAS 2002, INAI 2522, pp. 44-55 (2002).*

AutoList from javaboutique.internet.com/Autolist/, obtained Mar. 21. 2005.

Walter Smith, "The Storage User Experience in Windows Longhorn". MSR Academic Days, from research.microsoft.com/collaboratlon/university/europe/Events/AcademicDays/NE/04 04 Oslo/Walter Smith-Stsorage in Windows v3.ppt. Apr. 2004.

* cited by examiner

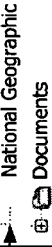

```
AutoList Editor  – Late Articles

In: │ Patrick , Common                                    │

Where :  Assigned to  = Nicolas
                  Priority  = 1
                  Due Date  > Last Month Also include : National Geographic Where :  Assigned to  = Nicolas
                  Priority  = 1
                  Due Date  > Last Month Add Filters
```

FIG. 9A

```
AutoList Editor  – Late Articles

In: │ Patrick , Common                                    │

Where :  Assigned to  = Nicolas
                  Priority  = 1
                  Due Date  > Last Month Also include : National Geographic Where :  Assigned to  = Nicolas
                  Priority  = 1
                  Due Date  > Last Month Also include : Wired Where :  Assigned to  = Nicolas
                  Priority  = 1
                  Due Date  > Last Month Add Filters
```

FIG. 9B

QUERY COMPOSITION INCORPORATING BY REFERENCE A QUERY DEFINITION

FIELD OF THE INVENTION

The present invention relates generally to computer systems, and more specifically to querying in a computer system. In particular, the invention relates to querying for a dynamic set of data files on a computer using an Autolist as at least a portion of the scope of the search matching a search criteria.

BACKGROUND OF THE INVENTION

Computer users often have a need to find files or folders stored at various locations on a computer or network. These files or folders may be searched based on a set of criteria as specified by the user. Typically, the user must specify the folders in which the user wishes to search, i.e., the scope of the search. For example, a user wishing to find all files satisfying desired criteria must specify which folders or computer drives to search, e.g. search the C: drive, D: drive, or C:\users\foo, etc.

Prior techniques of searching for desired files have been problematic and frustrating for the computer user. For example, these prior techniques typically permit searching for files within a specified scope. However, by searching in a specified scope of search, there is no flexibility in the search in the event that the range of files to be searched is changed independent of the scope. Prior techniques of searching for files are also inflexible because a search query in one search cannot be used to search for files in another search. Thus, prior art techniques do not provide the user with the capability of performing a search with a query definition by incorporating another query definition. Also, prior techniques of searching for files do not provide for the ability to dynamically alter a query definition such that a second search incorporating the query definition may be automatically updated. Rather, the user must repeatedly specify the search criteria or query definitions.

As a user continues to search for and identify data files, the data files become more and more abundant. Data files are stored in a pattern or taxonomy (e.g., directory structure). As new data files are identified (i.e., with new searches), these new data files are added to the existing directory structure or taxonomies, typically grouped according to specified criteria. For example, the specified criteria may correspond to search criteria for the data files identified. If a user changes the desired criteria on a subsequent search or otherwise alters the search criteria, additional data files may be identified satisfying the new search criteria. As more and more new searches are made with new search criteria, identified data files continue to be added to the existing taxonomy or directory structure. However, the new data files are merely included by adding the additional search criteria to the existing taxonomy (e.g., as subfolders) rather than dynamically updating the existing taxonomy based on modified search criteria. This results in rigid sets of identified data files that may correspond to potentially outdated search criteria because the taxonomy or directory structure of the identified data files is unable to fluidly adapt to changes in the search criteria.

For example, a computer user wishing to find all audio files on the computer for favorite (e.g., 5 star rating) 80's songs must specify all necessary filters, e.g., 80's music and/or 5 star for each search. If new files or songs are added, the search would have to be recreated and repeated. Because it is likely that new files are being added or removed periodically, the computer user would always have to repeat the time-consuming process of recreating the search criteria for an updated list of files. Also, if a modification of the query definition for identifying the desired files occurs, the user would be unable to easily and efficiently incorporate the modifications in the query definition in a second search that incorporates the query definition. Rather, the user must enter the search criteria again and repeat the search. Also, the user would have to manually re-organize a potentially large number of data files according to updated criteria.

Similarly, the computer user would also have to re-search for the same or modified list of files in a user specified folder or volume. This is frustrating for the user because desired files may be located in a folder other than the folder searched. If that is the case, the computer user who is searching in a different folder would fail to successfully locate all the files. Thus, the file would be effectively "lost" and the computer user would lose access to the file even if only because the file is not readily locatable.

Thus, there exists a need in the art for a system and method in which a computer user may locate desired files on a computer effectively and efficiently by defining or composing a query. Also, there is a need in the art to increase flexibility of a file search by providing a method and system for further utilizing a query within a query or combining queries and other filter information. There also exists a need in the art for a system and method in which to build a query structure that relates to other query structures such that other query definitions from other queries may flow into the query structure.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, in a first illustrative aspect of the invention, a search for at least one data file matching a search criteria is performed within a scope that is at least partially defined by a dynamic set of search criteria. The data file may be any computer data structure or file, such as, but not limited to, an executable program, a data link library, a configuration file, a database, a document file, a graphical image, a video file, a binary data file, a text data file, an object file, a source code file, an application specific file type, any other file, or other atomic data unit such as an email, calendar item, contact, task, etc. In this example, a computer may receive a query that defines a set of data files. The query defines the set of data files based on at least one criteria, termed "query definition." The query definition (including filter information for filtering a set of data files to obtain data files satisfying criteria set forth in the filter information) may be, for example, a desired keyword or a desired criteria, such as, but not limited to, a creation date of the file, a date the file was last modified, or any other condition that characterizes the data file.

An "Autolist" may be used to identify or search for desired data files. An Autolist, as used herein, refers to a persisted query definition that may be used to obtain a set of matching data files at any given time. The set of data files obtained from an Autolist is dynamic in that new data files satisfying the associated Autolist or persisted query definition are automatically returned upon invocation of the Autolist. Likewise, data files that no longer satisfy the associated Autolist (e.g., modifications to the data file cause the data file to no longer satisfy the query definition) result in the data file being automatically removed such that the data file is no longer returned upon invocation of the Autolist.

In one embodiment, an Autolist causes the return of a dynamic set of data files that match the corresponding persisted query definition. For example, a query definition may be received containing a set of desired criteria. The query definition may be applied to a search of data files to locate all data files that satisfy the query definition. Hence, an Autolist may be used to define the query definition for which a search may return data files satisfying the query definition.

In another example of the present invention, an Autolist may be used to define the scope of a second search for data files. In this example, an Autolist comprising a persisted query definition is received and data files satisfying the Autolist are identified. However, a second Autolist may be further received such that in addition to identifying data files satisfying the query definition set forth by the first Autolist, data files satisfying the query definition set forth by the second query definition are also identified. The data files that satisfy either the first Autolist or the second Autolist may also be dynamic in that any modifications to the data files or addition of new files are automatically reflected in the inclusions in either the first or the second Autolist. Thus, for example, if data files satisfying the query definition as set forth in the first Autolist are modified such that the data files no longer satisfy the first Autolist, the data files that no longer satisfy the first Autolist may be automatically removed such that they are not returned by the first Autolist. Similarly, data files that are modified such that the data files no longer satisfy the second autolist may also be removed from the second Autolist (i.e., not returned by the second Autolist).

In another aspect of the present invention, any number of Autolists may be used as a scope of search to define another Autolist. For example, two or more Autolists, each of which may be associated with an associated persisted query definition as set forth above, may be combined to define a scope of search for a dynamic set of data files. This combination of Autolists may define the scope of search such that a new Autolist is received and a set of data files is returned, the returned set of data files satisfying either of the Autolists to define the scope of search and also satisfying any criteria set forth in the new Autolist.

In another example of the present invention, additional criteria may be added to the Autolist resulting in an expanded persisted query definition. For example, a query definition may be received with additional filter information (i.e., search criteria) and the scope of the search may be defined by an Autolist such that data files satisfying the query definition of the Autolist and the additional filter information are found and returned. In this example, if a data file either does not satisfy the Autolist query definition or does not satisfy the additional filter information, the data file is not included in the group of returned data files. The group of returned data files may further be included in a subsequent search using a new Autolist.

In another aspect of the present invention, an Autolist is modified and causes an automatic corresponding modification in another Autolist. For example, a first Autolist may define a scope of search for a second Autolist. If the first Autolist is updated or modified, the scope of search for the second Autolist is automatically updated corresponding to the change in the first Autolist.

Also the invention may be implemented as software stored in a computer memory, may be run under the control of the computer's operating system, and may be used to search for files meeting various criteria defined by a user. As an example, the present invention provides a computer-readable medium having computer-executable instructions for searching or querying data files using Autolists.

BRIEF DESCRIPTION OF THE DRAWINGS

FIGS. 3A and 3B illustrate an example of creating an Autolist.

FIGS. 9A-9B illustrate examples of applying criteria to individual Autolist sources.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the present invention provide a method and system for querying and searching for data files on a computer using Autolists. As set forth above, an Autolist is a persisted query definition usable at any given time to obtain a set of files matching the query definition. The set of data files obtained from an Autolist is dynamic in that new data files satisfying the associated Autolist or persisted query definition are returned upon invocation of the Autolist. Likewise, data files that no longer satisfy the associated Autolist (e.g., modifications to the data file cause the data file to no longer satisfy the query definition) result in the data file no longer being returned upon invocation of the Autolist. Also as set forth above, an Autolist may be used to define the scope of search for another Autolist or persisted query definition.

In another example of one embodiment of the present invention, an Autolist may return data files that are located in different memory locations including but not limited to folders, volumes, remote machines or devices, etc. The search of the data files via the Autolist may be based on a property of the data files searched rather than the location of the data files in memory and may thus span any memory location. Further, an Autolist may be persisted by storing a definition of the Autolist in a data structure.

In another aspect of the present invention, an Autolist query may be used to define the scope of search to identify data files for another Autolist. This process enhances flexibility of the data file or document search. In yet another aspect of the present invention, an Autolist query may be combined with other filter information or criteria.

Figure 1:
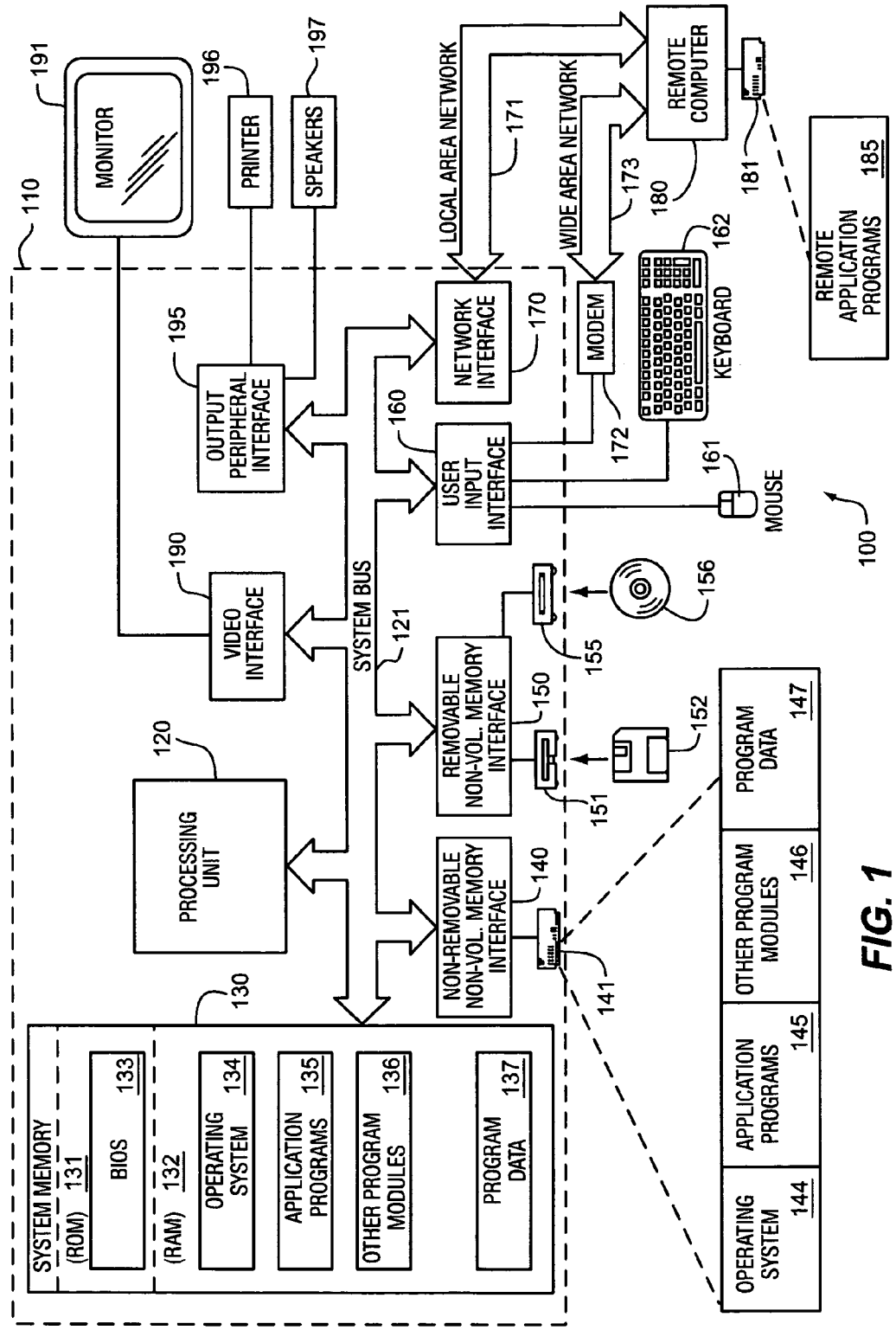
FIG. 1 illustrates an example of a system for implementing the invention which includes a general purpose computing device.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media includes both volatile and nonvolatile media, removable and non-removable media. By way of example, and not limitation, computer readable media may comprise computer storage media and communication media and includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes' wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program nodules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other, peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

One aspect of the present invention relates to the use of Autolists in searching, locating, or finding data files or documents on a computer. Data files may further be found across a plurality of memory locations and/or computers. For example, folders on a computer may be at different memory locations such that desired data files may be found in different folders. Likewise, data files may be found at different memory devices, such as but not limited to different storage devices connected to a computer, or different computers altogether. Hence, a storage device or server of a computer may contain many data files at various memory locations or data files may be stored in different folders, drives, storage devices, etc.

A computer user may wish to access or find all files satisfying certain criteria (i.e., query definition) including files satisfying the query definition that are located at a plurality of different memory locations (e.g., in other folders or storage devices). In one aspect of the present invention, a query containing a query definition is received from the user and files are searched based on the query definition. The query definition provides the criteria under which files are searched. For example, the query definition may provide a keyword or a plurality of keywords to search for in desired files. The query definition may be persisted in a data structure (i.e., an Autolist), which the user can reuse as needed, and which may be used by the operating system of the computer to create a virtual folder corresponding to the Autolist.

The present invention provides a method and system in which the computer user may create an Autolist by applying a set of query definitions (i.e., search criteria). The query definitions may include a definition of a scope of search. Creating an Autolist involves defining the scope of search for the Autolist by providing a query definition for the Autolist. Any number of Autolists may be created with any number of applied query definitions. Also, composing an Autolist may be accomplished when the scope of the search of an Autolist is defined by another Autolist or set of Autolists.

Figure 2:
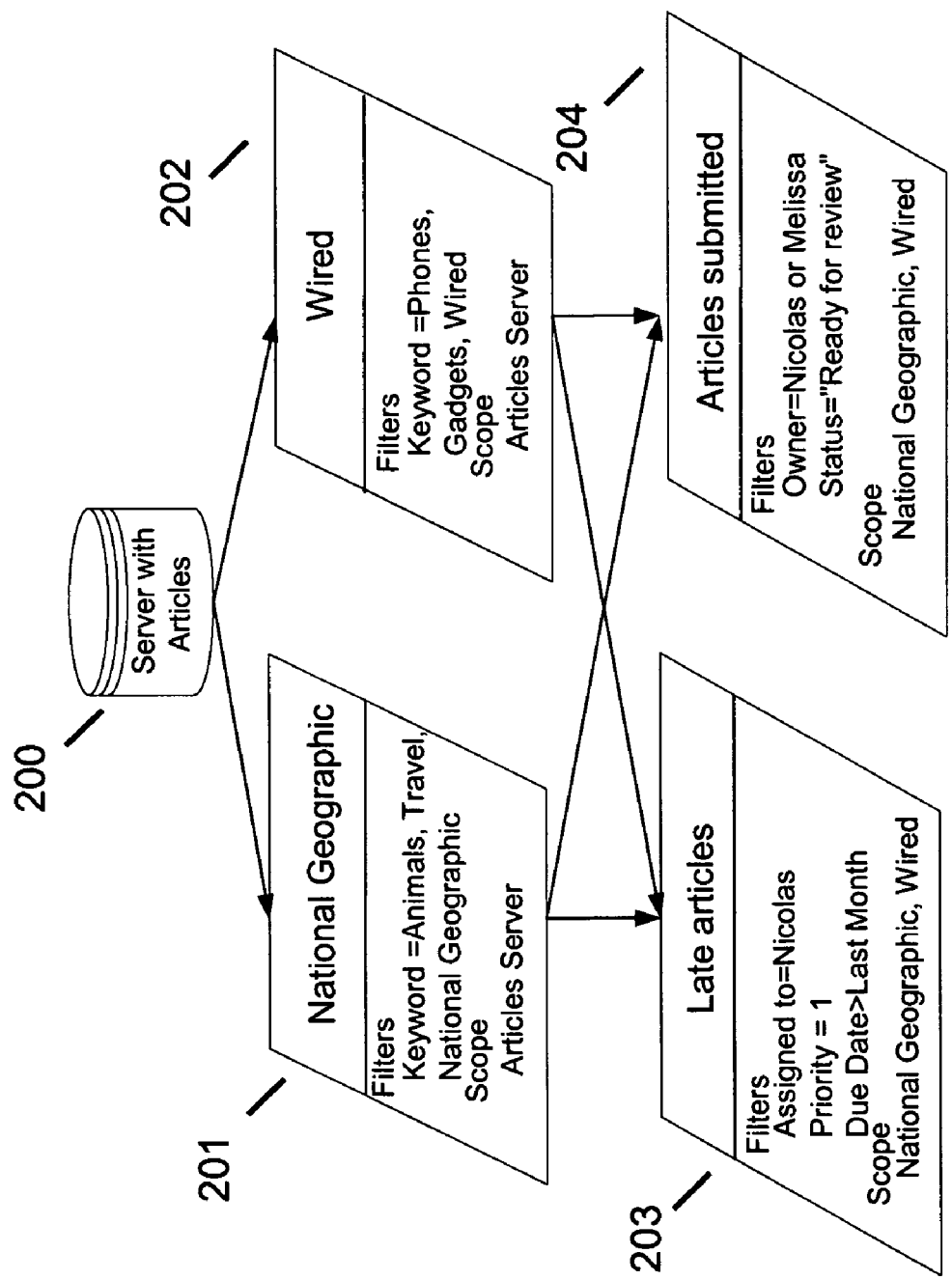
FIG. 2 illustrates an architectural overview diagram illustrating relationships between Autolists according to an illustrative aspect of the invention.

FIG. 2 illustrates an aspect of the present invention for creating and/or composing Autolists, and performing querying based on Autolists. The computer of FIG. 2 comprises a memory storage device such as a server 200 in which files are stored. In this example, the server 200 stores text files of magazine or newspaper articles for a reporter. The user in this example might be a reporter for multiple periodicals, two of which are illustrated in FIG. 2 (e.g., National Geographic and Wired). The reporter stores all articles he has written on the server 200 whether articles are written for National Geographic or Wired Magazine or any other periodical the reporter may write for. This example of the present invention provides a method and system to enable efficient access and recall of a desired article or a set of articles satisfying a query definition. In one example illustrated in FIG. 2, a first Autolist 201 is created by applying a query definition to obtain articles associated with National Geographic articles pertaining to animals or travel. The first Autolist 201 in this example returns articles by processing a persisted query definition, for example, searching for articles containing keywords "Animals," "Travel," or "National Geographic." Furthermore, the Autolist may also indicate the scope of search over which a search is to be performed (i.e., where the search will be performed, e.g., the Server 200). Thus, in this example, the Autolist 201 provides a relevant query definition that is used to search for corresponding data files satisfying the Autolist query definition located on the Server 200.

Similarly, a second Autolist 202 may be created to search for articles that are stored on the Server 200 and also satisfy a second query definition. In this example, the second Autolist provides a query definition (i.e., search criteria) to find certain desired Wired Magazine articles (e.g., Wired Magazine articles pertaining to phones and gadgets). In this example, keywords Phones, Gadgets, and Wired (provided by the Autolist 202) are searched over the designated search scope (e.g., the Server 200, provided by the Autolist 202 in this example) to locate all Wired articles pertaining to phones and gadgets stored on Server 200.

FIGS. 3A and 3B illustrate an example of creating an Autolist as exemplified by creating the National Geographic Autolist 201. In FIGS. 3A and 3B, the user from the example of FIG. 2 selects the National Geographic articles pertaining to animals and travel by entering corresponding search criteria to obtain documents of this type. In FIG. 3A, the user searches for National Geographic articles using the desired query definition to obtain a collection of articles 301 satisfying the search criteria illustrated in the address bar 301 (also referred to as a breadcrumb bar). The user may further save the query definition as an Autolist. In this example, the user saves the query definition as an Autolist 201 entitled "National Geographic" 302 as illustrated in FIG. 3B. In this way, the user may easily access the updated search at any time.

Figures 4A, 4B:
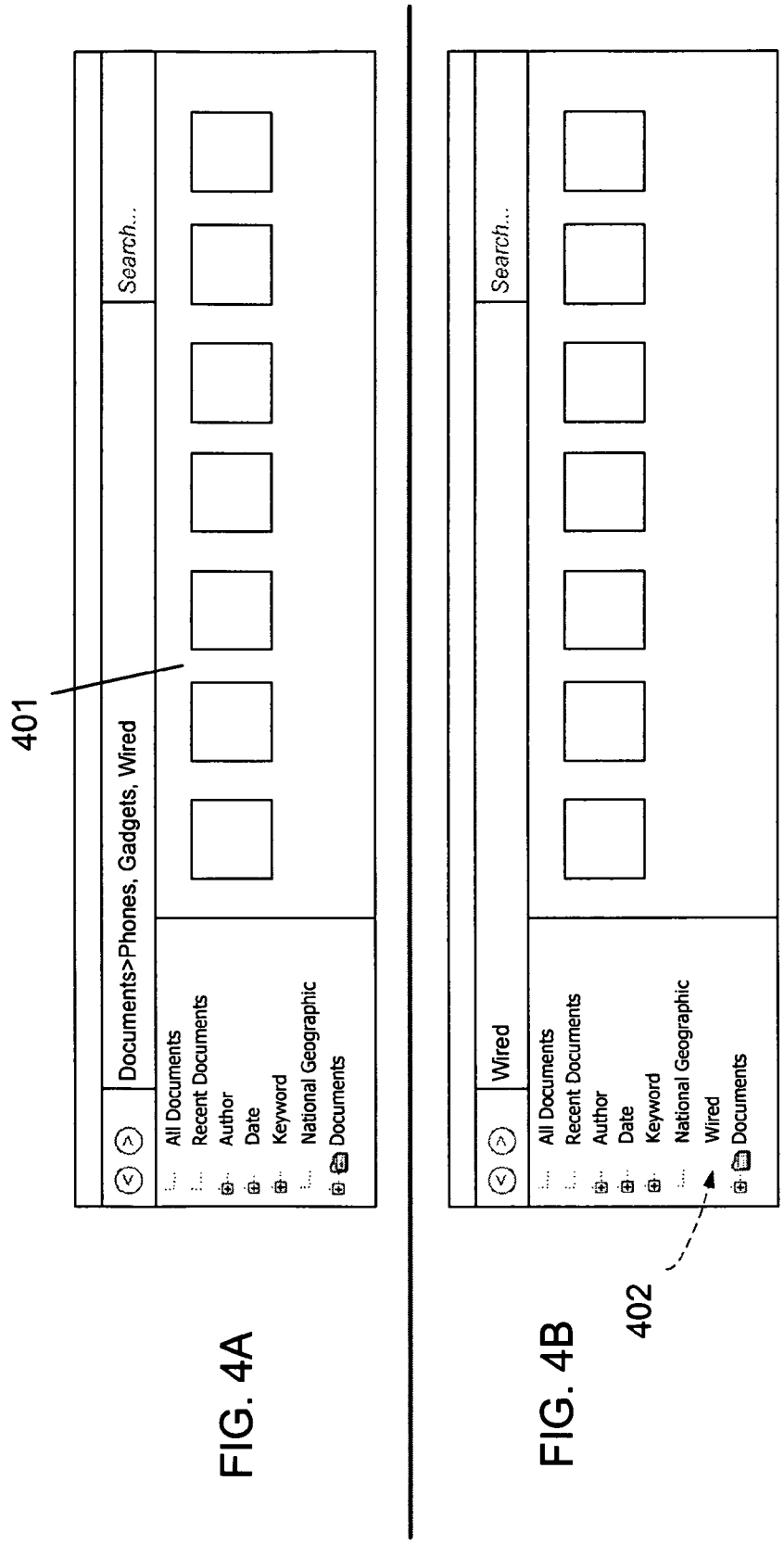
FIGS. 4A and 4B illustrate another example of creating an Autolist.

Similarly, FIGS. 4A and 4B illustrate creating an Autolist as exemplified by creating an Autolist for Wired Magazine in which the user searches for Wired magazine articles pertaining to phones and gadgets. In this example, the user uses a relevant query definition illustrated in the address bar 401 to obtain the Wired articles 401 pertaining to phones and gadgets (FIG. 4A) and saves the resulting query definition as an Autolist 202 entitled "Wired" 402 (FIG. 4B).

Referring back to FIG. 2, an Autolist may also be used to define the scope of search corresponding to a search based on a subsequent query definition. In addition, the query definition may be expanded during a subsequent search by adding additional search criteria to the query definition. Composing an Autolist may also be accomplished by defining the scope of search of the Autolist by another Autolist or set of Autolists. In this example of composing an Autolist, a query definition of a third search is defined by a third Autolist entitled "Late Articles" 203. The query definition of the third search (i.e., the "Late Articles" 203 Autolist) indicates as part of the query definition that the scope of search is the two pre-existing Autolists, namely, National Geographic and Wired. Additional search criteria is added to the query definition of the Late Articles Autolist 203. As FIG. 2 illustrates, the new search criteria added to the query definition of Autolist 203 applied in this example are "Assigned to=Nicholas", Priority=1, and Due Date>Last Month. Hence, the Late articles Autolist 203 of this example enables searching and identification of all articles within the National Geographic Autolist and the Wired Autolist that have due dates from at least last month, have high priority and are assigned to Nicholas.

Notably, if changes are made to any of the Autolists used in defining the scope of the search, or the Autolist used in defining the scope of the search results in different search results, the third Autolist incorporating the modified previous Autolist(s) as part of the search scope is also automatically updated. In this example, if changes in the query definition of either National Geographic or Wired articles are made (e.g., if National Geographic is updated to include articles pertaining to Egyptian art in addition to animals and travel or if Wired is updated to include articles pertaining to fiber optics in addition to phones and gadgets), those changes will be automatically reflected in the Late Articles Autolist query.

Figure 5A:
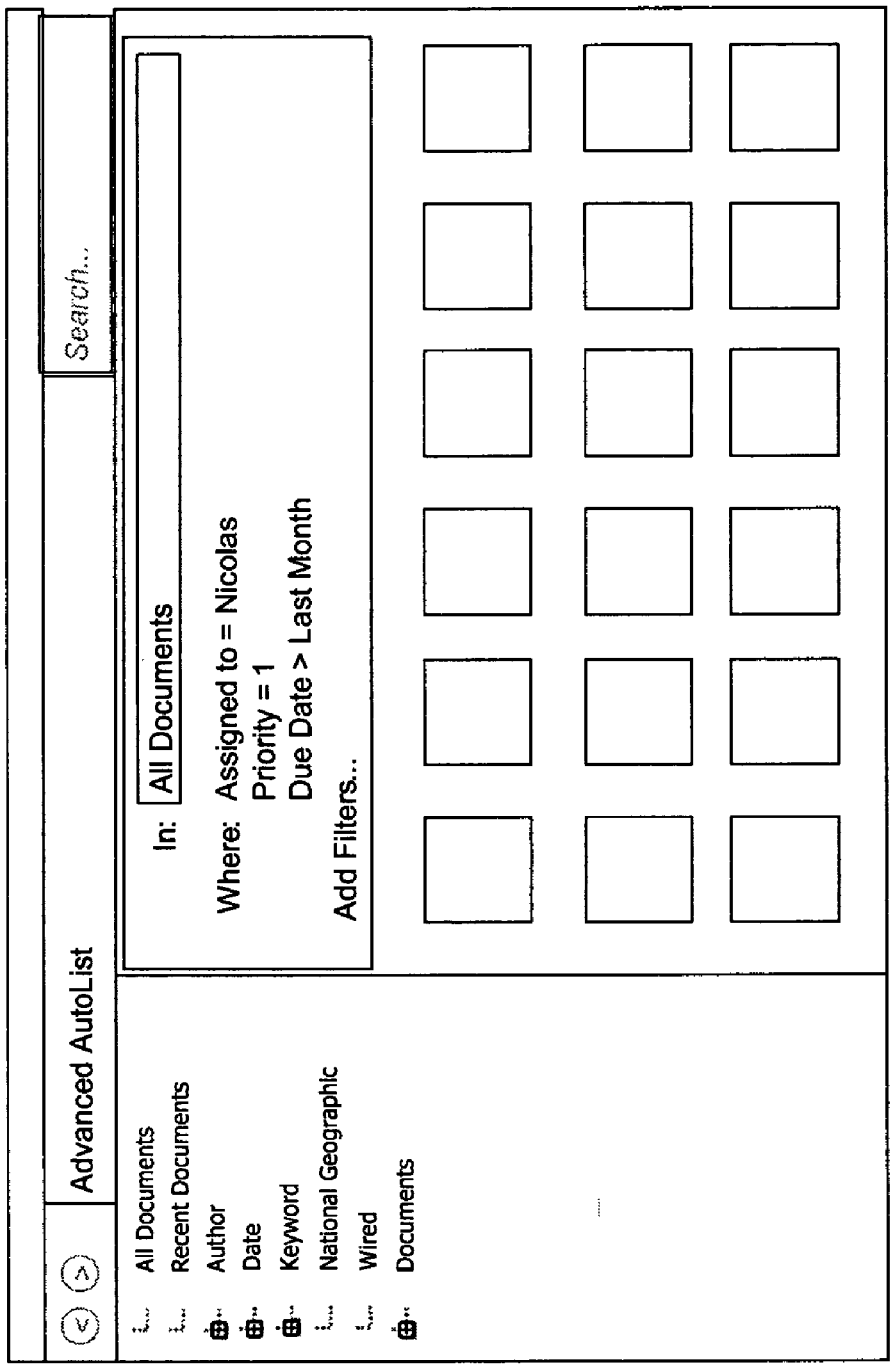
FIGS. 5A-5C illustrate one aspect of an example of replacing the composition of one Autolist with the composition of two other Autolists.
Figure 5B:
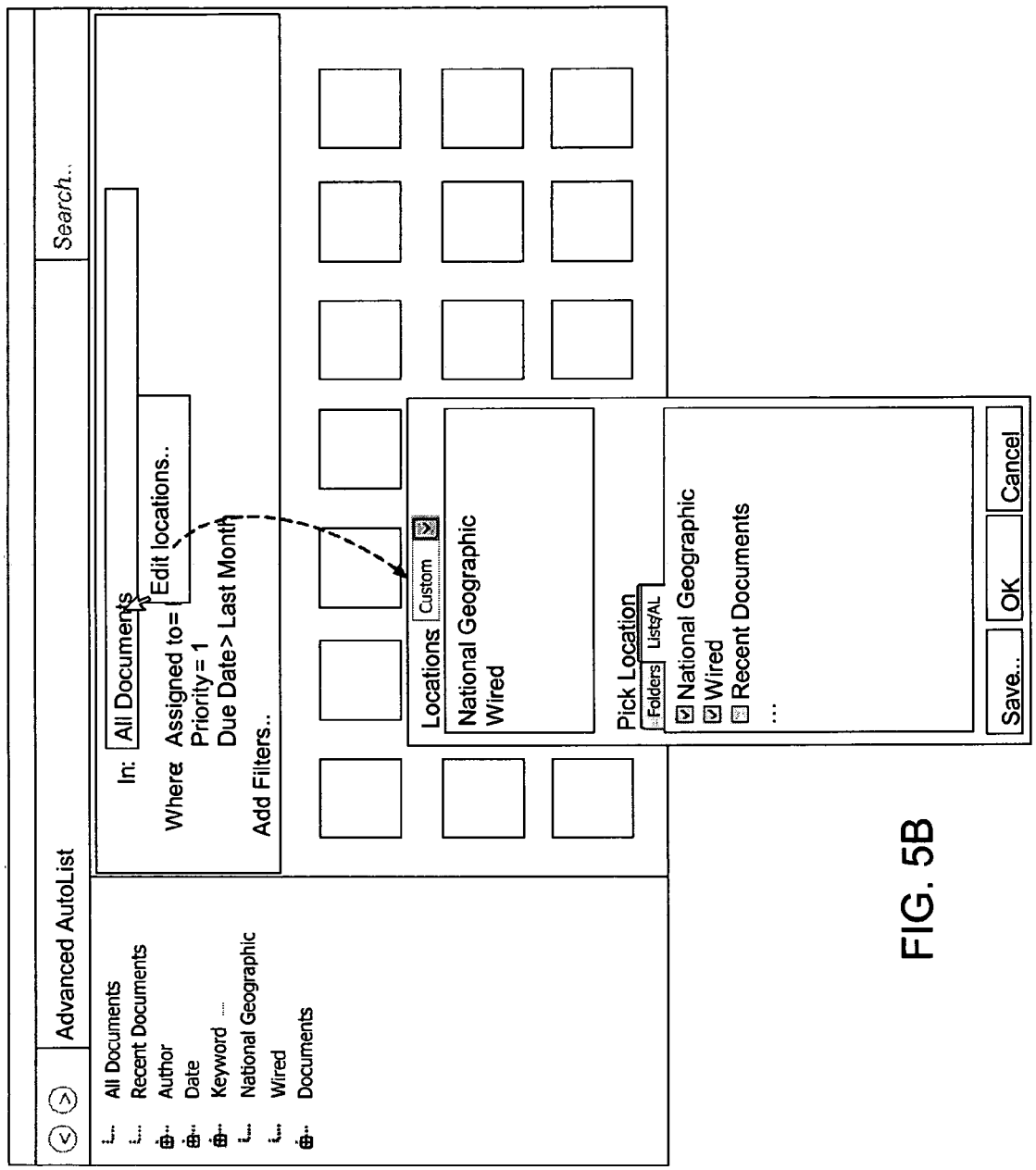
Figure 5C:
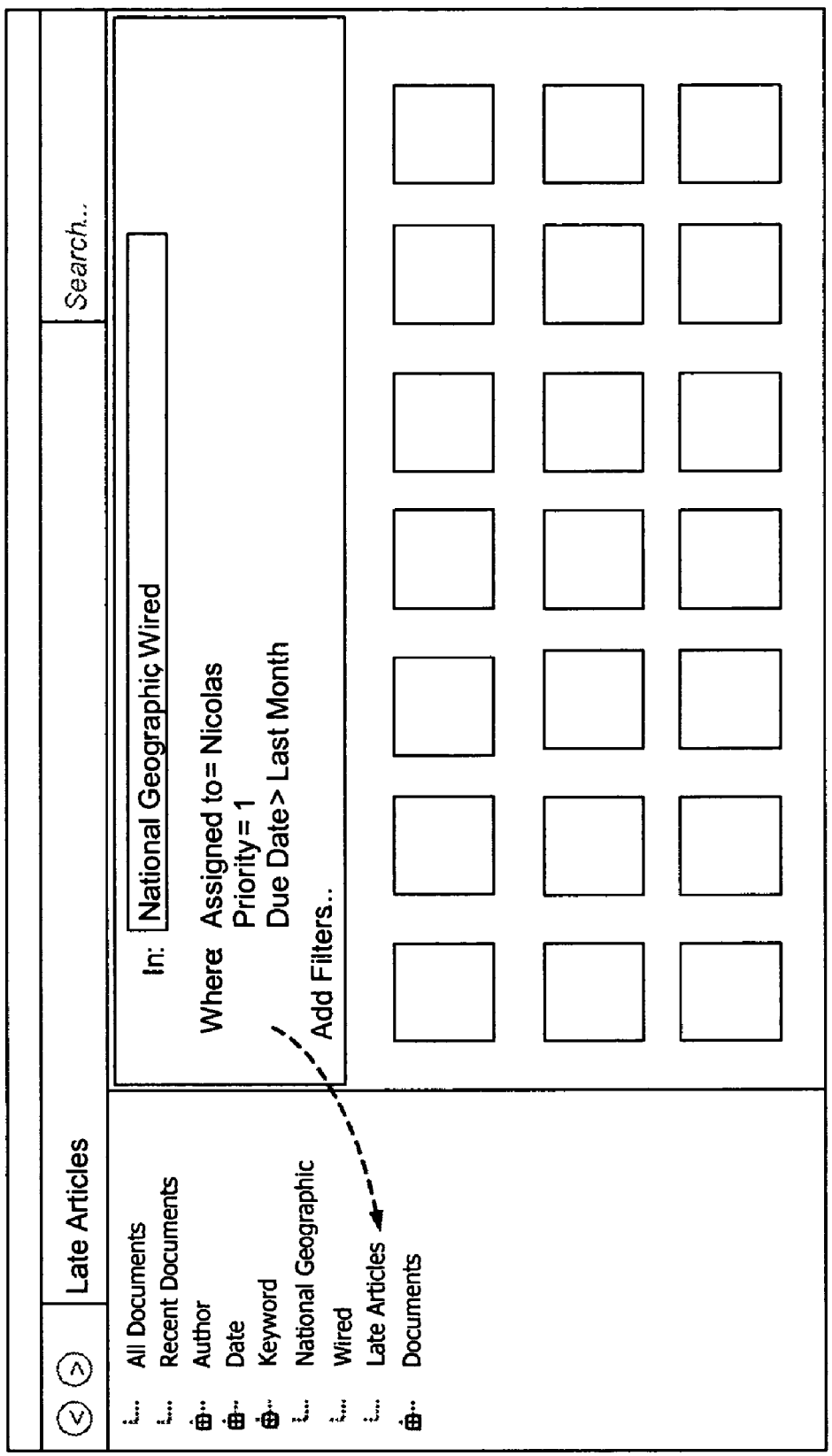

FIGS. 5A-5C illustrate one example of the composition of the Late Articles Autolist illustrated in FIG. 2. In this example, the user (e.g., the reporter) has missed deadlines in submitting articles to the editor of Wired Magazine and wishes to find and identify all overdue Wired Magazine articles. To do so, the user/reporter in this example may enter a query definition to search for all Wired Articles that satisfy the criteria of being overdue. The resulting query constitutes a "Late Articles" Autolist. In this way, Late Articles Autolist is composed to keep track of deadlines and potentially late article submissions.

Also, the user/reporter of this example may apply search criteria to locate all data files satisfying the specified search criteria. As FIG. 5A illustrates, the user/reporter applies search criteria (i.e., a query definition) to obtain articles of a certain priority and due date that are assigned to him. For example, the search based on the query definition is based on the Late Articles Autolist and results in the return of all articles assigned to "Nicholas" (i.e., the user), with a priority=1 and a due date of at least last month (i.e., Due Date>Last Month).

FIG. 5B illustrates specifying the scope of the search. In this example, the user has already created an Autolist that searches and locates all relevant National Geographic articles and another Autolist that searches and locates all relevant Wired Magazine articles. Rather than having to enter these criteria into another search within a scope at least partially defined by the Autolist for the relevant National Geographic articles and the Autolist for the relevant Wired Magazine articles (which would hinder the flexibility of the search), the user may compose an Autolist by specifying the scope of the search through the use of the pre-existing Autolists (in this example, the National Geographic and/or Wired Autolists).

Also, the user need only specify the Autolists to be used as the scope of the search rather than having to re-enter all of the desired keywords and other criteria represented by the previously existing Autolists. This saves time and effort on the part of the user. FIG. 5B illustrates the composition of a custom Autolist in which the scope is set to include the persisted query definitions associated with the National Geographic Autolist and the Wired Autolist. The newly composed Autolist that defines a new query definition that includes the indication of the scope of search corresponding to the National Geographic and Wired Autolists may be saved under a unique name. In this example, the newly composed Autolist is saved as the "Late Articles" Autolist (FIG. 5C).

FIG. 2 further illustrates another example of using an Autolist to define the scope of a search. In FIG. 2, a user/reporter may wish to retrieve all articles that have been submitted for publishing. Further, it may be desired to search for all articles submitted by a particular individual and/or all articles having a particular status. As FIG. 2 illustrates, an Autolist may be composed that searches for and returns all such desired articles. In this example, a user wishes to find all National Geographic articles and Wired Articles that are "Ready for Review" (i.e., a particular status) and are written by either Nicolas or Melissa. A corresponding query definition is received corresponding to the desired criteria and articles written by either Nicolas or Melissa that are "Ready for Review" are searched for and returned by the Articles Submitted Autolist 204. However, because the scope of the search is part of the query definition and is defined in this example by the National Geographic and Wired Autolists, only relevant National Geographic and Wired articles are returned by the Articles Submitted Autolist 204.

Figure 6:
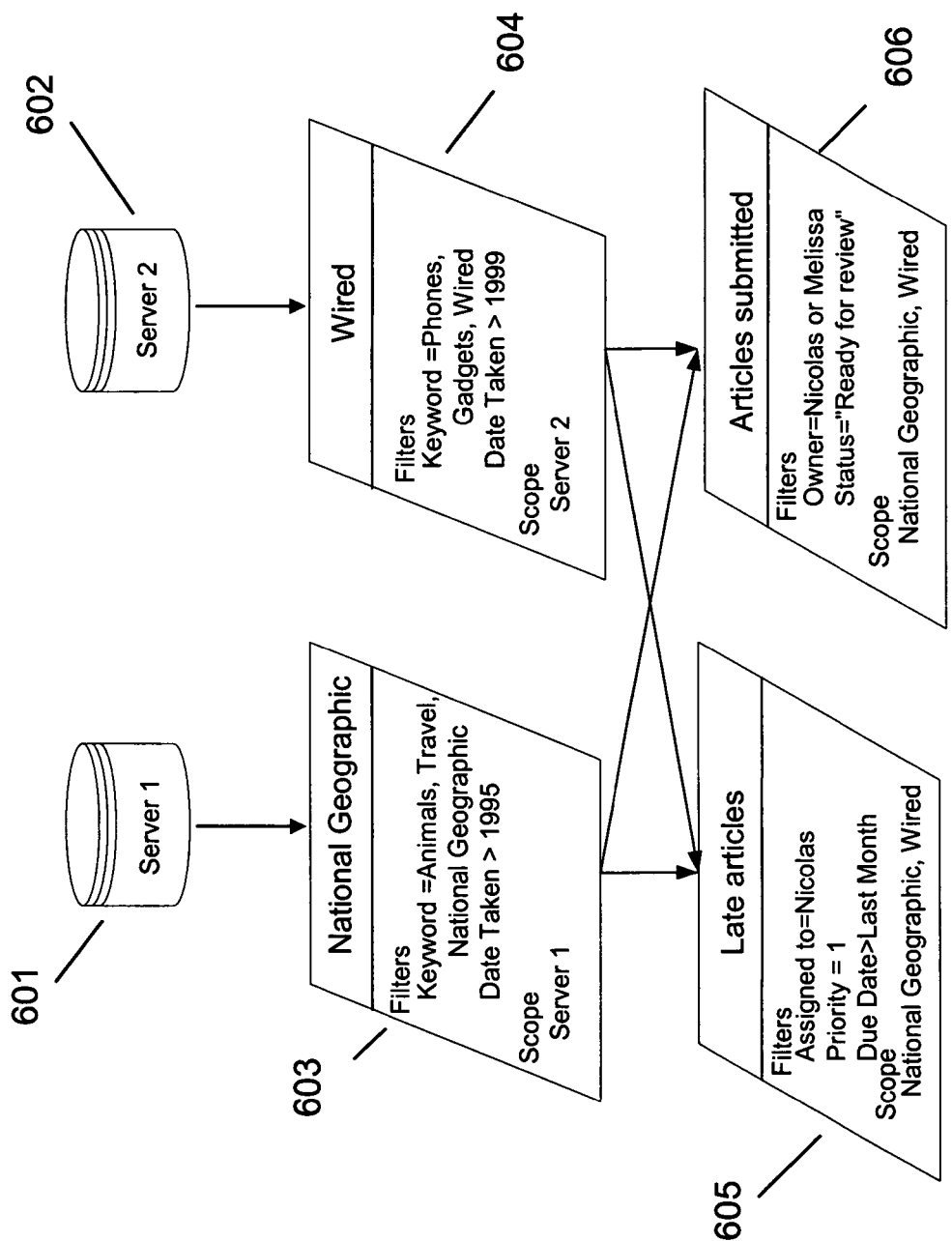
FIG. 6 illustrates a data flow diagram illustrating different sources for different Autolists according to an illustrative aspect of the invention.

It is understood that the above examples are merely to illustrate and not to limit the present invention as the Autolists may take many forms. In another example, an Autolist may define a query definition for searching one source or scope while another Autolist may define a query definition for searching a different source or scope as illustrated in FIG. 6. In this example, National Geographic articles satisfying desired criteria (here, those National Geographic articles pertaining to animals and travel and are taken no earlier than 1995) are returned in the National Geographic Autolist 603. Also, Wired Magazine articles that pertain to phones and gadgets and are taken no earlier than 1999 are returned in the Wired Autolist 604. However, the National Geographic articles are searched within Server 1 601 to form the National Geographic Autolist 603 while the Wired Magazine articles are searched within Server 2 602 to form the Wired Autolist 604. Therefore, each Autolist obtains articles from a different source or storage location. Searching within the scope set forth in the query definitions of the National Geographic Autolist 603 and the Wired Autolist 604 for articles satisfying a desired query definition returns articles corresponding to either the Late Articles Autolist 605 or Articles Submitted Autolist 606 in FIG. 6. For the Late Articles Autolist 605, the articles returned have recent due dates, high priority and are assigned to a particular reporter (i.e., Nicholas). For the Articles submitted Autolist 606, the articles retrieved are owned by either Nicolas or Melissa and are "ready for review". Both the Late Articles Autolist 605 and the Articles Submitted Autolist 606 search for National Geographic articles and Wired Magazine articles as the scope of the search is defined by the respective persisted query definitions of the National Geographic Autolist 603 and the Wired Autolist 604, even though the National Geographic Autolist 603 searches in Server 1 601 while the Wired Autolist 604 searches in Server 2 602. In this example, the Late Articles Autolist 605 and the Articles Submitted Autolist 606 each take the union of the results from each Autolist used in the scope (i.e., the National Geographic Autolist 603 and the Wired Autolist 604 in this example) and apply their respective additional search criteria within their respective query definitions. Thus, Autolists used to define a scope of a search may be of different or even conflicting criteria.

Figures 7A, 7B, 7C:
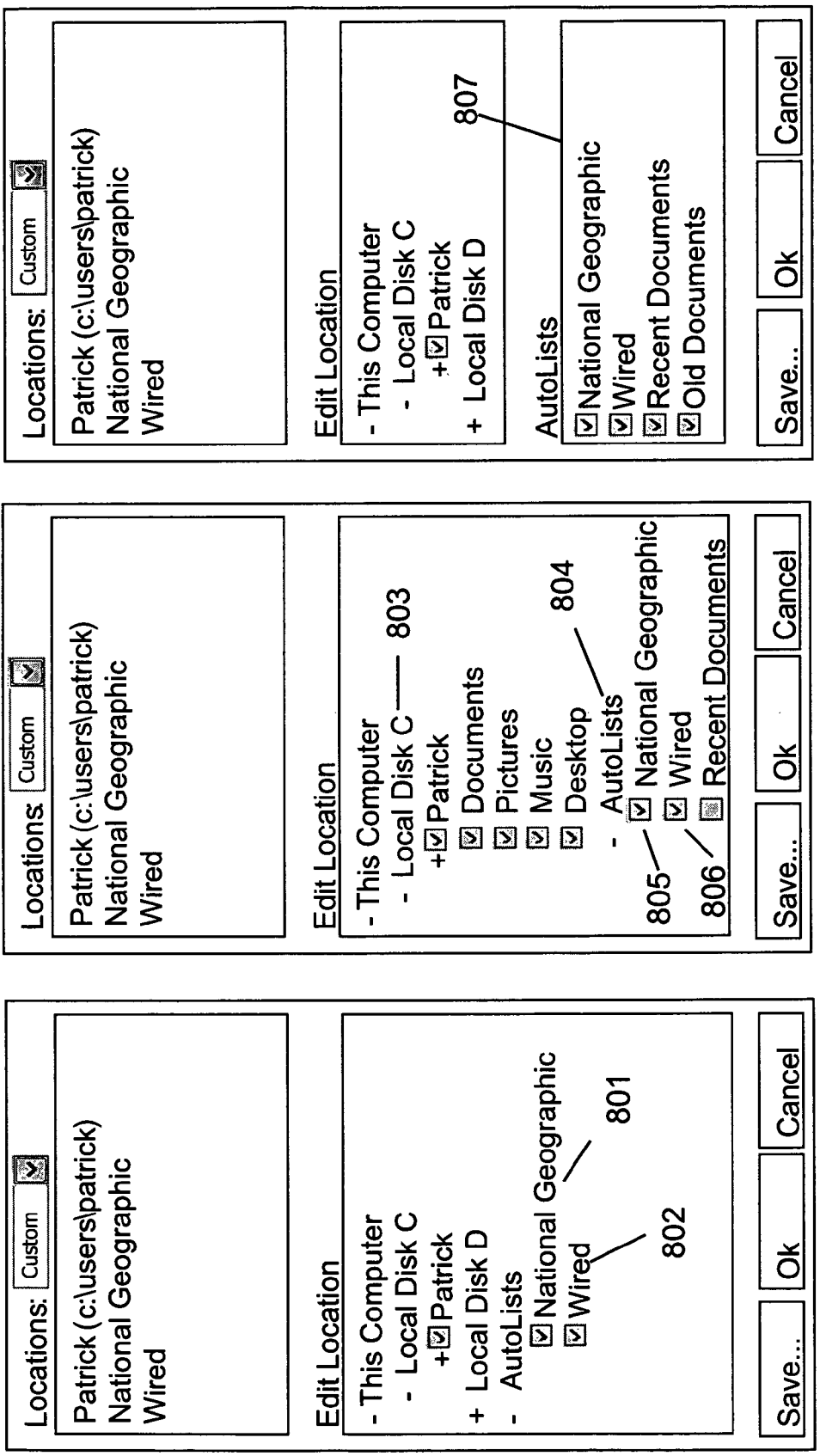
FIGS. 7A-7C illustrate examples of formats for Autolist selection controls.

The invention is not limited to any format of Autolist as any format of an Autolist may be used within the scope of the present invention. FIGS. 7A-7C illustrate additional non-limiting examples of alternative user-interface formats that may be used for the Autolist editor. In FIG. 7A, the Autolists are provided as a node in a tree. Each of the Autolists contains a check box for selection. For example each of the National Geographic Autolist 801 and the Wired Autolist 802 have a corresponding check box.

FIG. 7B illustrates the Autolist nodes as a subnode within a higher order node (e.g., Local Disk C). For example, each of the National Geographic Autolist 805 and Wired Autolist 806 are depicted under the Autolists subnode 804 which is in turn depicted under the Local Disc C node.

FIG. 7C illustrates the Autolists as a separate list of Autolists 807 that is separate from other locations in the computer. In addition, filters may be contained in the Autolists and may be shown inline in an Autolist editor (not shown). However, any method of reflecting the filters may be used. For example, the filters may be indicated as a tooltip upon hovering a cursor (not shown).

Figure 8A:
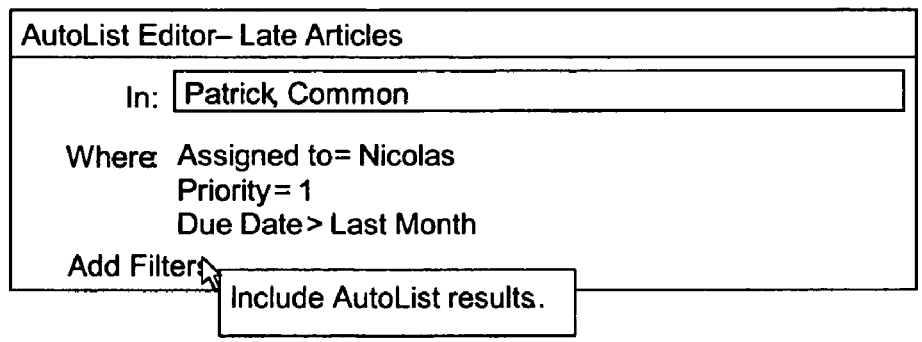
FIGS. 8A-8C illustrate an example of exposing an Autolist as a filter criteria.
Figure 8B:
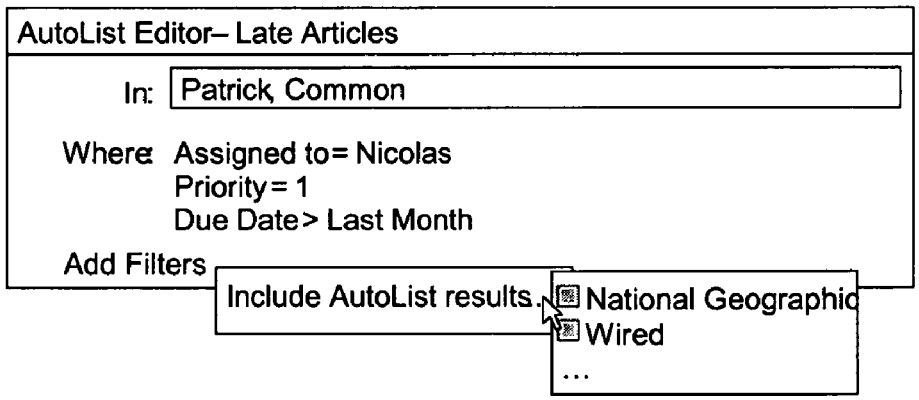
Figure 8C:
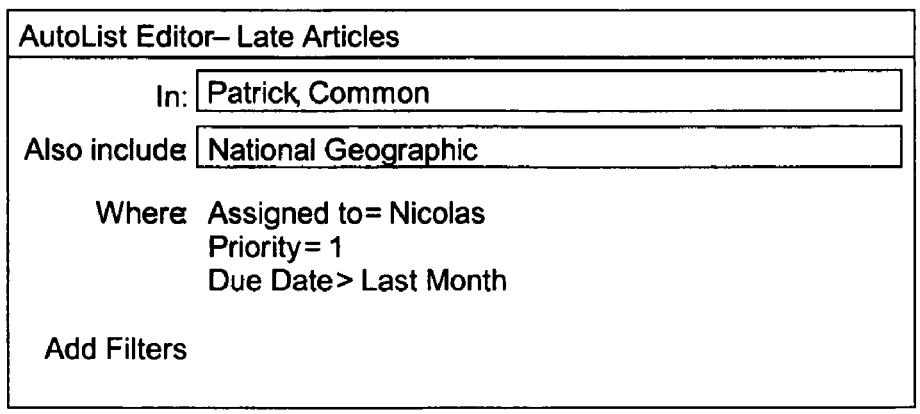

Alternatively, an Autolist may be exposed as search criteria within a query definition during the creation of another Autolist. In FIG. 8A, the National Geographic Autolist is added as a search criteria such that the results returned from the National Geographic Autolist is incorporated as a part of the query definition of the Late Articles Autolist. FIG. 8B illustrates the addition of Autolist results via the National Geographic Autolist by adding the National Geographic Autolist as a filter (i.e., a search criteria). In this example, the Autolist is selected via a dropdown menu but any method may be employed. FIG. 8C illustrates the National Geographic Autolist included in the scope of the Late Articles Autolist.

In yet another example of an alternative method of providing an Autolist, an Autolist may display multiple criteria. For example, in FIG. 9A, the full details of the Late Articles Autolist is displayed including an Autolist included as another criteria. In this example, the National Geographic Autolist is included as an additional criteria to find articles assigned to Nicolas with high priority and with due dates at least last month. Thus, in addition to searching in "Patrick" and "Common" for such articles, the Late Articles Autolist also searches with the National Geographic Autolist. These additional criteria are displayed in the Autolist editor.

FIG. 9B illustrates another example of providing an Autolist with multiple criteria in which a Wired Autolist is used to find potentially overdue Wired articles. For example, in FIG. 9B, the Wired Autolist is included as another criteria. In this example, the Wired Autolist is further included to find Wired articles assigned to Nicolas with a high priority and with due dates at least last month in addition to National Geographic articles. In this example, full details of all Autolists included as criteria are provided.

According to another illustrative aspect of the invention, duplicate results might not be returned by the Autolists. For example, a first Autolist may return data files from a set of memory locations, e.g., a set of folders, disc drives, memory devices, etc. A second Autolist may return data files from a second set of memory locations. There may further be overlapping memory locations between the first Autolist and the second Autolist such that at least one of the memory locations searched by the first Autolist may be the same as the memory locations searched by the second Autolist. If a third Autolist incorporates both the first Autolist and the second Autolist, there may be duplication of returned data files. Thus, not every data file returned by the third Autolist is unique. This results in repetitive search results in which non-unique, duplicative data files are returned.

Figure 10:
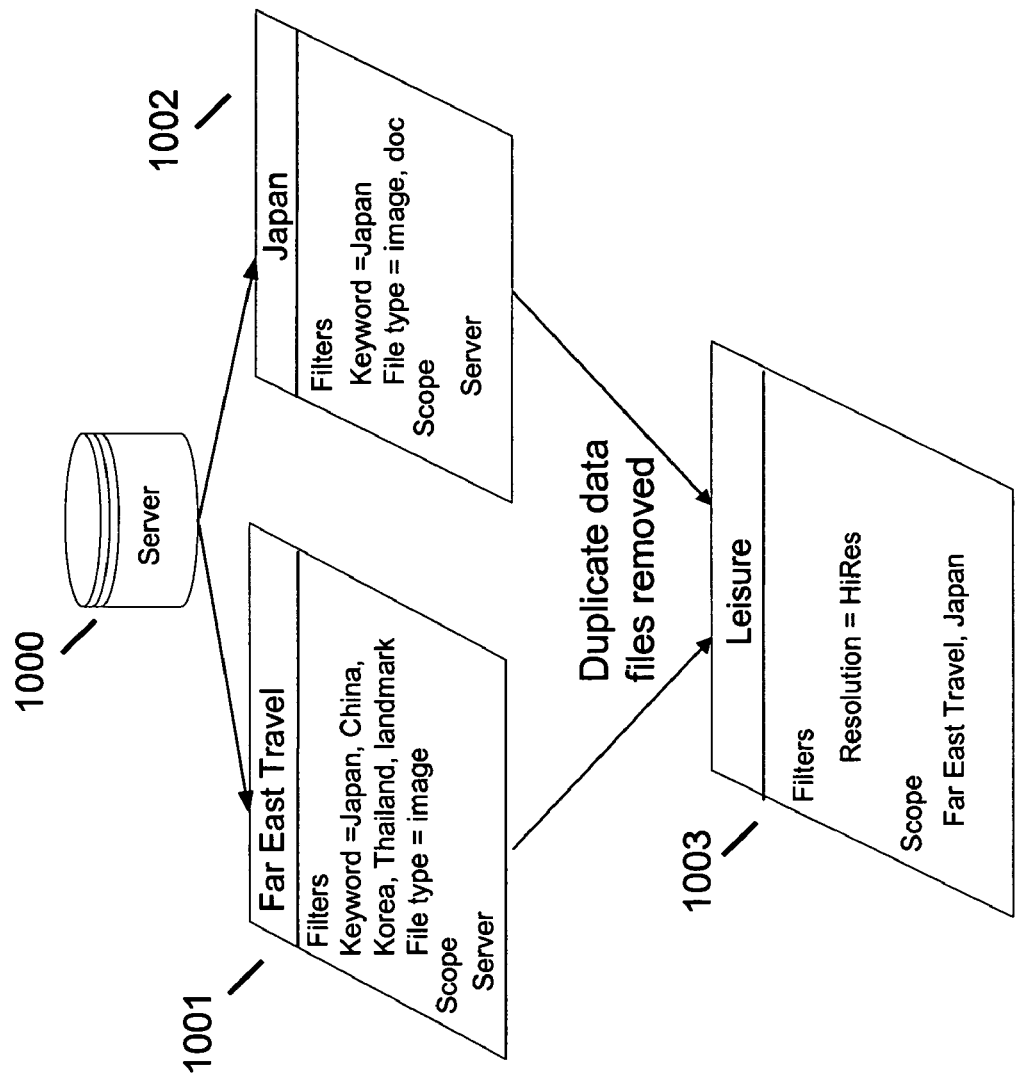
FIG. 10 is an architectural overview diagram illustrating an example of managing duplicate data files of Autolists.

An example of an Autolist managing duplicate data files contained on a server 1000 within a set of returned data files is illustrated in FIG. 10. In FIG. 10, a Far East Travel Autolist 1001 is created with a query definition that returns data files corresponding to image files pertaining to vacation photos from the Far East. In this example, the Far East Travel Autolist 1001 returns image data files depicting landmarks in Japan, China, Korea, or Thailand. Also, a Japan Autolist 1002 is created with a query definition that returns data files corresponding to images and documents pertaining to Japan. A Leisure Autolist 1003 is composed by a query definition that incorporates the Far East Travel Autolist 1001 and the Japan Autolist 1002 by reference. In this example, the Leisure Autolist 1003 incorporates the Far East Travel Autolist 1001 and the Japan Autolist 1002 as defining the scope of search. Thus, the Leisure Autolist 1003 in this example returns data files corresponding to both vacation photos from the Far East and images and documents pertaining to Japan.

However, because the Leisure Autolist 1003 incorporates both the Far East Travel Autolist 1001 and the Japan Autolist 1002 as the scope of search, if any data files satisfy the query definition of both the Far East Travel Autolist 1001 and the Japan Autolist 1002, those data files may be returned twice in the Leisure Autolist 1003. If the data files returned are not unique, then duplicative results are obtained which leads to confusing search results. To eliminate problems associated with redundant search results, the Autolist may filter and return only unique data files. Thus, in this exemplary aspect of the present invention, the system may detect duplicate data files and return one instance of such data files only (i.e., return only unique data files).

Figure 11:
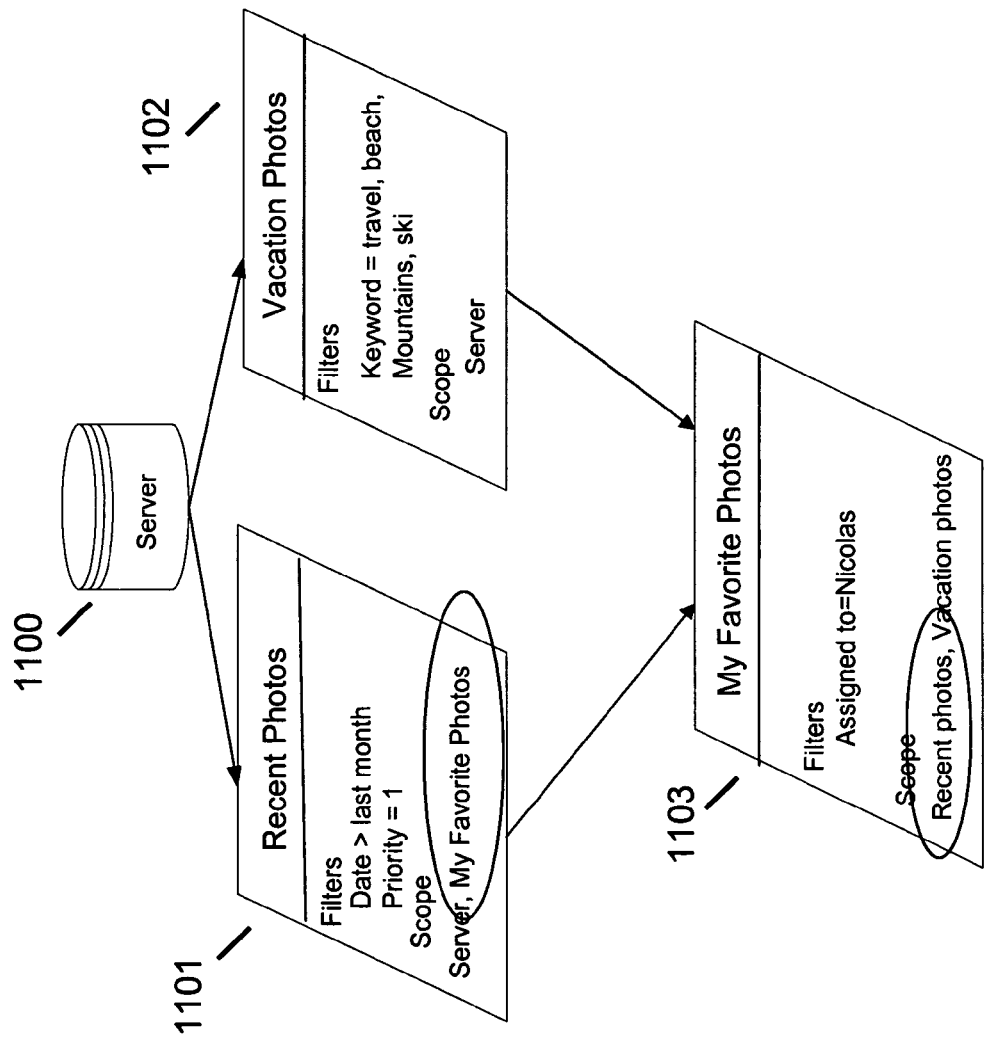
FIG. 11 is an architectural overview diagram illustrating cycling of Autolists.

In another example of an aspect of the present invention, undesired cycling in Autolists may be prevented. For example, if a first Autolist is composed that incorporates a second Autolist in a query definition, an endless cycle of referencing between Autolists may result if the second Autolist also incorporated the first Autolist in a query definition as well. Likewise, if an Autolist in a series of incorporations by reference of other Autolists in turn incorporates one of the other Autolists, a cycle may form that may cause the Autolist to fail. FIG. 11 illustrates an example of cycling of Autolists. In this example, a My Favorite Photos Autolist 1103 is composed that attempts to return image data files of a user (Nicolas, in this example). The My Favorite Photos Autolist 1103 in this example incorporates by reference a Recent Photos Autolist 1101 and a Vacation Photos Autolist 1102, both contained on a server 1100. Thus, the Recent Photos Autolist 1101 and the Vacation Photos Autolist 1102 provide the scope of search for the My Favorite Photos Autolist 1103. As FIG. 11 also illustrates, the Recent Photos Autolist 1101 also incorporates the My Favorite Photos Autolist 1103. The My Favorite Photos Autolist 1103 incorporating the Recent Photos Autolist 1101 and the Recent Photos Autolist 1101 incorporating the My Favorite Photos Autolist 1103 creates a cycle of referencing between the Autolists which may result in an infinite loop of referencing.

In this example of the present invention, the undesired cycling of a first Autolist referencing a second Autolist that may in turn reference the first Autolist is prevented. Likewise, cycling may occur if a first Autolist incorporates a second Autolist that may not directly incorporate the first Autolist by reference but may incorporate a third Autolist. The third Autolist may then incorporate the first Autolist closing the loop and creating a similar undesired cycle. Any number of Autolists may be involved in such a cycle with any number of intervening Autolists.

Figure 12A:
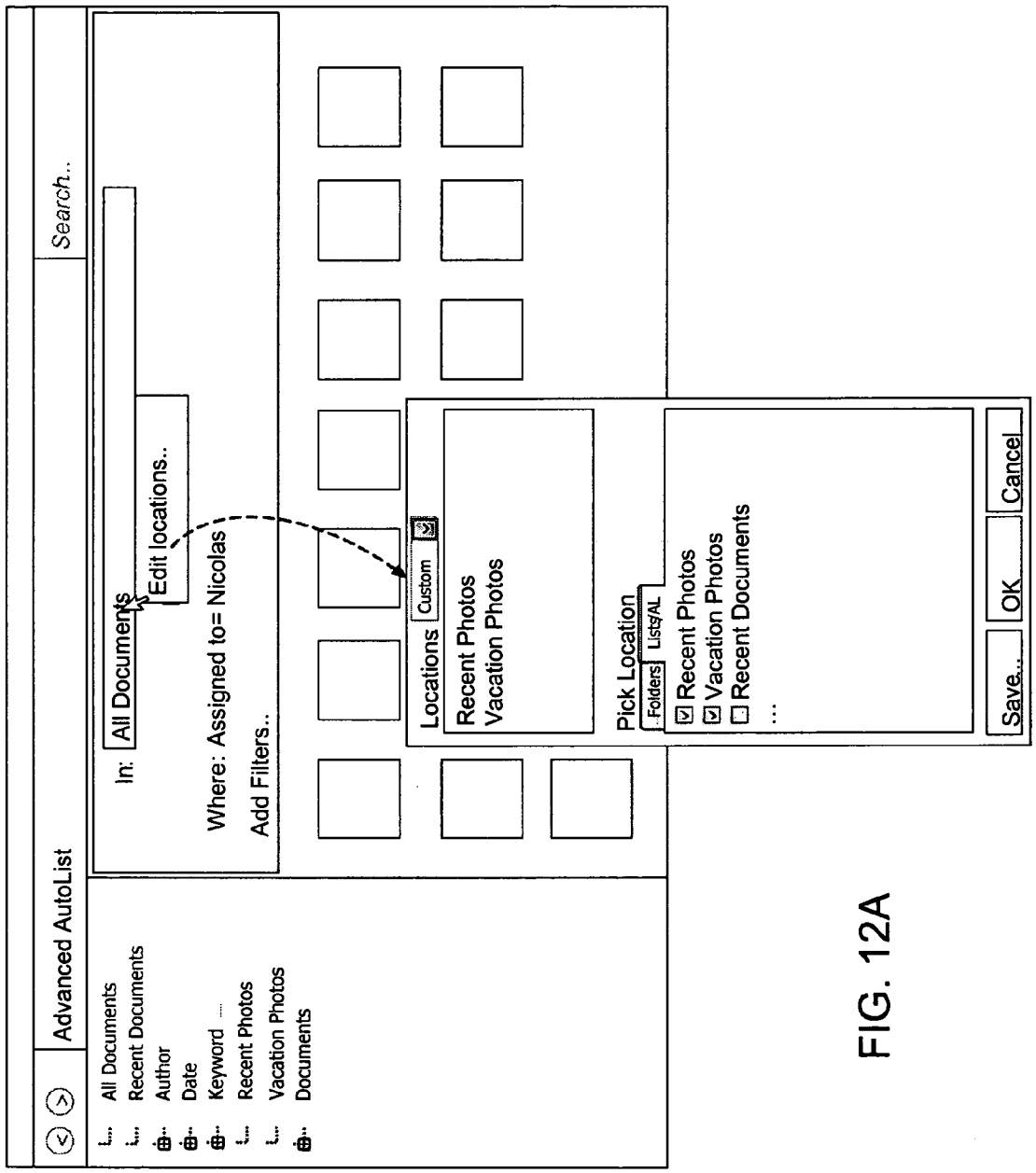
FIGS. 12A and 12B illustrate an example of the prevention of cycling of Autolists.
Figure 12B:
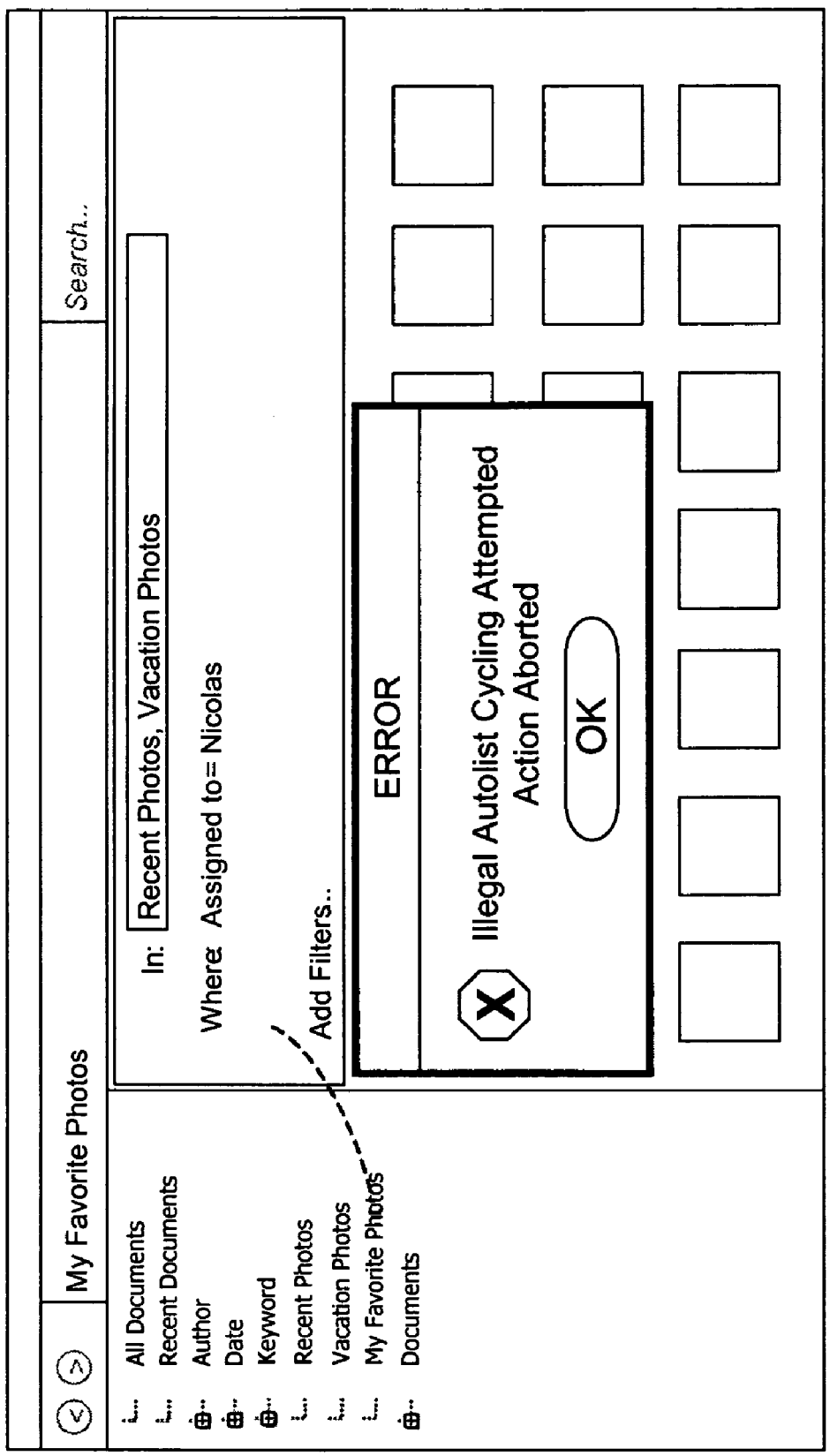

FIGS. 12A and 12B illustrate one example of the present invention in which cycling of Autolists is prevented. In this example, the composition of a My Favorite Photos Autolist 1103 is attempted that incorporates the Recent Photos Autolist 1101 as a scope of search as illustrated in FIG. 11. However, the Recent Photos Autolist 1101 already incorporates the My Favorite Photos Autolist 1103. Thus, the system detects the inadvertent attempt at cycling of Autolists and prevents its occurrence. As FIG. 12A illustrates, each of the Recent Photos Autolist and the Vacation Photos Autolist is created to include respective query definitions. FIG. 12B illustrates an attempt to compose the My Favorite Photos Autolist 1103 as illustrated in FIG. 11. However, the My Favorite Photos Autolist incorporates the Recent Photos Autolist 1101 as illustrated in FIG. 11 which would cause impermissible cycling of the Autolists. Thus, as illustrated in FIG. 12B, the system provides a message to notify the user that an illegal attempt at referencing an Autolist has occurred and prevents the reference from taking place.

FIGS. 12A and 12B illustrate an example of the prevention of cycling of Autolists that incorporates interaction with a user, for example, with a user interface, however, there are many other examples of preventing cycling of Autolists. For example, cycling may be prevented at the processing level as well. In this example, an attempt to create a cycle in Autolists is detected during processing of the Autolists and the cycle is automatically terminated. In this way, cycling of Autolists is prevented without the need to interact with a user.

Figure 13:
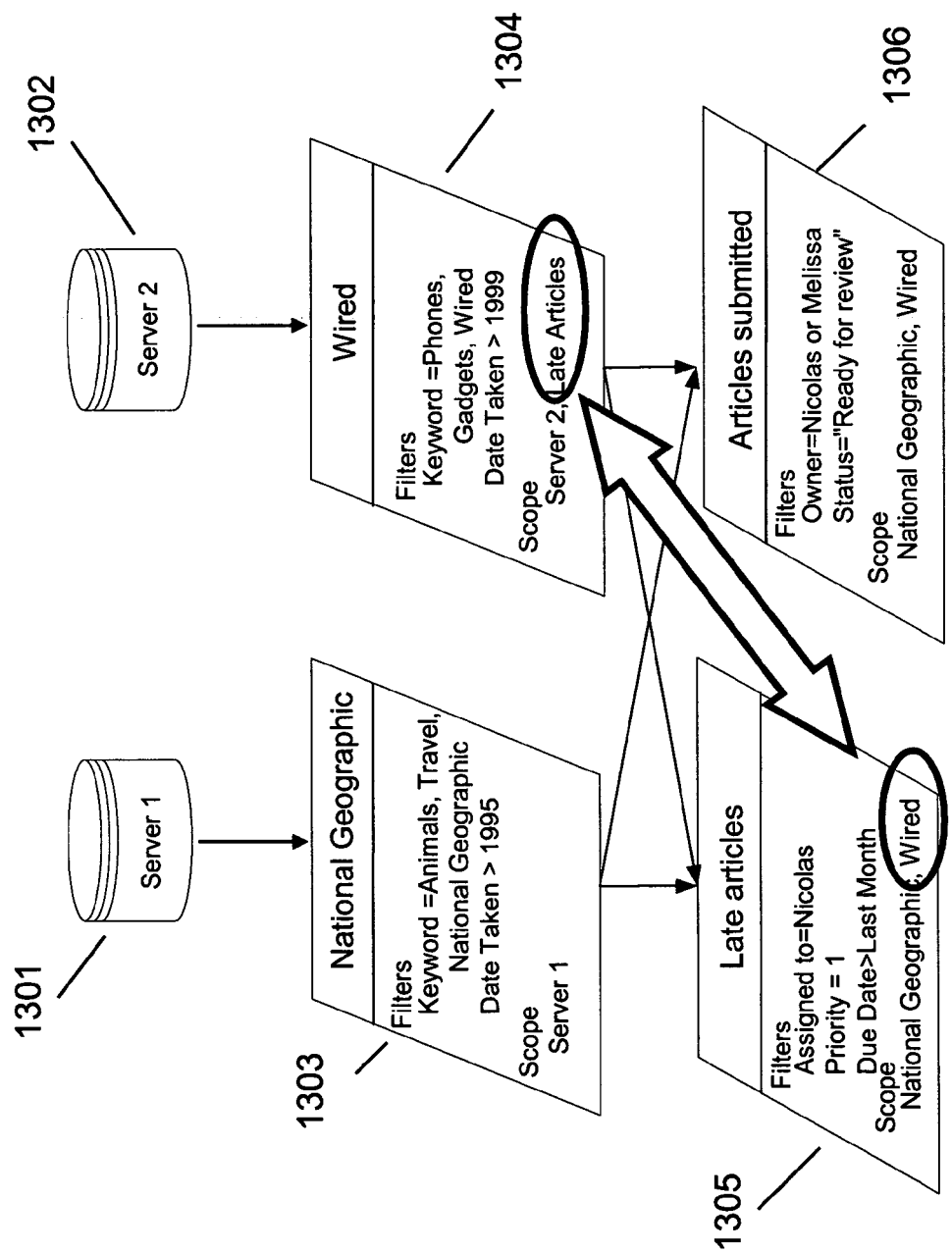
FIG. 13 is a data flow diagram illustrating another example of prevention of cycling of Autolists.

FIG. 13 is a data flow diagram illustrating another example of preventing cycling in Autolists at the processing level. In this example, a National Geographic Autolist 1303 returns desired National Geographic articles (i.e., pertaining to animals or travel) by searching data files in Server 1 1301. A Wired Autolist 1304 returns desired Wired articles (i.e., pertaining to phones and gadgets) by searching data files in Server 2 1302. However, in this example, an attempt is made for the Wired Autolist 1304 to include a Late Articles Autolist 1305 in the scope of search for the Wired Autolist 1304. The Late Articles Autolist 1305 returns overdue articles by incorporating the National Geographic Autolist 1303 and the Wired Autolist 1304 as a scope of search. However, this is an attempt at creating a cycle in the Autolists because the Wired Autolist 1304 attempts to incorporate the Late Articles Autolist 1305 while the Late Articles Autolist 1305 attempts to incorporate the Wired Autolist 1304.

In this example of prevention of cycling of Autolists, the attempted cycle is detected at the processing level without the need for a user interface. The system detects the cycle and automatically remove the cycle. For example, the Wired Autolist 1304 illustrated in FIG. 13 may return relevant Wired articles (i.e., Wired articles pertaining to phones or gadgets) by searching in Server 2 1302. Because incorporating the Late Articles Autolist 1305 is detected as an impermissible cycle, the Wired Autolist 1304 automatically "trims" the Late Articles Autolist 1305 from the scope of search. Hence, the Articles Submitted Autolist 1306 may return relevant submitted articles by incorporating the National Geographic Autolist 1303 and the Wired Autolist 1304 as illustrated in FIG. 13 while the Wired Autolist 1304 searches only Server 2 1302 for relevant Wired articles (i.e., pertaining to phones or gadgets). The incorporation by reference of the Late Articles Autolist 1305 by the Wired Autolist 1304 is automatically "trimmed." A notification or warning message may further be provided to the user to inform the user that the Autolists were modified, if desired.

Autolists may be stored as code in many formats. For example, Autolist may be stored in the form of a markup language such as XML. An example of an Autolist stored as an XML file is as follows:

```
<?xml version="1.0"?>
<persistedQuery version= "1.0">
    <viewInfo viewMode="Icons" iconSize="128">
        <stackList>
            <stack viewField="microsoft/Author"/>
        </stackList>
    </viewInfo>
    <query>
        <scope>
            <include saveLocation="true"
            knownFolder="{FDD39AD0-238F-46AF-ADB4-6C85480369C7}"/>
            <include knownFolder="{ED4824AF-DCE4-45A8-81E2-FC7965083634}"/>
            <include knownFolder="{B4BFCC3A-DB2C-424C-B029-7FE99A87C641}"/>
        </scope>
        <visibleInList>
            <visibleIn name="Document"/>
        </visibleInList>
    </query>
    <properties>
        <visibleIn>Document AutoList</visibleIn>
    </properties>
</persistedQuery>
```

In the above example, the Autolist provides all data files that are stacked by a particular author.

Another example of an Autolist stored as XML is as follows:

```
<?xml version="1.0"?>
<persistedQuery version="1.0">
    <viewInfo viewMode="Details" iconSize="16">
        <sortList>
            <sort viewField="microsoft/FileLastEditedTime" direction="descending"/>
        </sortList>
    </viewInfo>
    <query>
        <scope>
            <include saveLocation="true"
            knownFolder="{FDD39AD0-238F-46AF-ADB4-6C85480369C7}"/>
            <include knownFolder="{ED4824AF-DCE4-45A8-81E2-FC7965083634}"/>
            <include knownFolder="{B4BFCC3A-DB2C-424C-B029-7FE99A87C641}"/>
        </scope>
        <visibleInList>
            <visibleIn name="Document"/>
        </visibleInList>
    </query>
    <properties>
        <visibleIn>Document AutoList</visibleIn>
    </properties>
</persistedQuery>
```

In this example, all data files are returned in descending order of the last edit date.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

We claim:

1. A computer-implemented method of searching for at least one data file matching a user-defined query definition, the method comprising:

receiving a first user input defining a first query definition for a first query, wherein the first query definition includes a first scope defining a first physical file location to be searched and a first set of one or more textual search terms used;

executing the first query to generate a first plurality of data files stored on the first physical file location that have one or more characteristics that match the first set of the one or more textual search terms;

receiving a second user input defining a second query definition for a second query, wherein the second query definition includes a second scope defining a second physical file location to be searched and a second set of one or more textual search terms, wherein the second scope incorporates by reference a third query definition that comprises a third query definition having a third scope and a third set of one or more textual search terms, thereby defining the second scope as a combination of items satisfying the third query definition and items that are stored in the second physical file location;

receiving a third user input modifying the third scope of the third query definition to incorporate by reference the first query definition and the second query definition, thereby defining the third scope as a combination of items satisfying the first query definition and items that satisfy the second query definition;

detecting an attempted cycle within the third query definition by determining that the second query definition incorporates the third query definition by a reference and the third query definition incorporates the second query definition by reference;

automatically removing the attempted cycle from the third query definition by trimming the incorporation by reference of the second query definition from third query definition;

executing the third query to identify multiple data files matching the third query definition, wherein the multiple data files are in the first plurality of data files generated by executing the first query definition and have one or more characteristics that match the third set of one or more textual search terms; and displaying a representation of the multiple data files with only one unique copy of each data file.

2. The method of claim 1 wherein the second scope comprises a plurality of memory locations.

3. The method of claim 1 wherein the second set of one or more criteria are different from the first set of one or more criteria.

4. A computer readable storage medium storing computer executable instructions for performing the method of claim 1.

5. A computer-implemented method of searching for at least one data file matching a user-defined query definition, the method comprising:

storing a first definition for a first autolist that returns a first set of search results by applying a persisted first query definition that has a first scope that defines a first physical file location and a first set of one or more textual search criteria;

storing a second definition for a second autolist that returns a second set of search results by applying a persisted second query definition that has a second scope that defines a second physical file location and incorporates a third autolist by reference, thereby defining the second scope as a combination of items returned by the third autolist and items that are stored in the second physical file location;

storing a third definition for the third autolist that returns a third set of search results by applying a third persisted query definition including a third scope and a third set of textual search criteria, wherein the third scope incorporates the first and the second autolists by reference receiving a request to execute the second autolist;

detecting an attempted cycle between the second autolist and the third autolist;

automatically removing the cycle at the processing level without need for user input;

displaying the third set of search results, wherein the third set of search results include all non-duplicate items within the first set of search results that match the third set of textual search criteria.

6. The method of claim 5, further comprising:

a receiving user input specifying modification to the first query definition;

identifying that the scope of search for the third autolist is based on the first autolist and in turn the first query definition; and automatically generating an updated third set of search results based on an updated first autolist.

7. The method of claim 5, wherein said removing the cycle at the processing level without need for user input occurs by trimming the second scope to remove the incorporation of the third query definition by reference.

8. A computer-readable storage medium having computer-executable instructions embodied thereon, that when executed by a computing device performs a method of searching for at least one data file matching a user-defined query definition the method comprising:

receiving a first user input defining a first query definition, wherein the first query definition comprises a first scope and a first set of one or more search criteria, wherein the first scope defines a first computer storage location to be searched;

receiving a second user input defining a second query definition, wherein the second query definition comprises a second scope and a second set of one or more search criteria, wherein the second scope defines a second computer storage location to be searched and incorporates a third query definition by reference wherein the third query definition comprises a third scope and a third set of one or more search criteria;

receiving a third user input a modifying the third scope of the third query definition, to incorporate by reference the first query definition and the second query definition thereby limiting the third scope to a combination of results produced by executing a query using the first query definition and results produced by executing the second query definition;

detecting an attempted cycle between the second and the third query definitions;

searching for data files matching the third query definition after automatically trimming the incorporation by reference of the second query definition from the third scope; and displaying search results.

9. The method of claim 8 further comprising providing data files matching both the first and second query definitions, wherein each of the data files provided are unique.

10. The method of claim 8 further comprising determining if the first query definition incorporates the third query definition by reference prior to the searching step, wherein the searching step is performed only if the first query definition does not incorporate the third query definition by reference.

11. A computer-implemented method of searching for at least one data file matching a user-defined query definition, the method comprising:

presenting a graphical user interface comprising a first query definition and a second query definition, each of the first query definition and the second query definition being previously defined by user input, wherein the second query definition incorporates the first query definition by reference;

receiving a first user input modifying the first query definition to incorporate the second query definition by reference;

determining that an attempted cycle is created when the first query definition incorporates the second query definition by reference because the second query definition already incorporated the first query definition by reference; and displaying a warning to the user that the second query definition creates a cycle, thereby preventing creation of a cycle between first and the second query definition.

12. The method of claim 11, wherein the first query definition comprises at least one condition that characterize desired features of the data files.

13. The method of claim 11, wherein the second query definition is user selectable for incorporation by reference into a subsequent query definition.

14. The method of claim 11, wherein the first query definition specifies a first file location one which the first query is to be executed and the second query definition specifies a second file location one which the second query is to be executed, and where in the first file location and the second file location are different.

* * * * *